United States Patent [19]

Bezzerides

[11] 4,282,934
[45] Aug. 11, 1981

[54] GUIDANCE SYSTEM FOR AGRICULTURAL IMPLEMENTS

[76] Inventor: Paul A. Bezzerides, P.O. Box 211, Orosi, Calif. 93647

[21] Appl. No.: 72,447

[22] Filed: Sep. 4, 1979

[51] Int. Cl.³ .............................................. A01B 69/00
[52] U.S. Cl. ...................................... 172/26; 172/833
[58] Field of Search ............... 172/26, 126, 534, 540, 172/548, 669, 765, 767, 768, 770, 277, 833; 180/131; 280/87.2, 776; 104/244.1; D15/11

[56] References Cited

U.S. PATENT DOCUMENTS

| D. 31,490 | 9/1899 | Kegans | D15/11 |
|---|---|---|---|
| 761,802 | 6/1904 | Wells | 172/770 |
| 2,038,936 | 4/1936 | Jacks | 172/770 |
| 2,242,486 | 5/1941 | Sutherland | 172/277 |
| 2,759,407 | 8/1956 | Kelley | 104/244.1 |
| 3,797,602 | 3/1974 | Sumida | 172/26 X |
| 3,840,076 | 10/1974 | Capehart | 172/26 X |
| 4,033,417 | 7/1977 | Rau et al. | 172/624 X |
| 4,117,889 | 10/1978 | Larson | 172/26 |
| 4,180,133 | 12/1979 | Collogan et al. | 172/26 |

FOREIGN PATENT DOCUMENTS

| 536736 | 2/1957 | Canada | 172/669 |
|---|---|---|---|
| 2014235 | 10/1971 | Fed. Rep. of Germany | 104/244.1 |

Primary Examiner—Richard T. Stouffer
Attorney, Agent, or Firm—Huebner & Worrel

[57] ABSTRACT

A guidance system for agricultural implements having a frame mounted for longitudinal earth traversing movement and limited lateral movement; a transversely inclined blade mounted on the frame having a low side and a high side and adapted to form a correspondingly transversely inclined track in the earth; a plow mounted on the frame adjacent to the low side; a planar guard mounted on the frame adjacent to the high side and disposed in an erect plane substantially aligned with the direction of movement; and a wheel mounted on the frame having an axis substantially parallel to the inclination of the blade and a tread in rolling engagement with the track.

3 Claims, 8 Drawing Figures

Fig.1

GUIDANCE SYSTEM FOR AGRICULTURAL IMPLEMENTS

BACKGROUND OF THE INVENTION

1. Field of the Invention

The present invention relates to a guidance system for agricultural implements and more particularly to such a system which precisely guides an implement having earth working tools in relation to a row of plants, or other track, the system engaging a guidance furrow substantially parallel to the row and simultaneously forming such a furrow.

2. Description of the Prior Art

A major problem in the growing of a row crop is the guidance of earth working implements along a row or rows of the crop during operations such as planting, weeding, mulching, and harvesting. The implement must be precisely guided so as to perform the desired operation without damaging the plants or seeds prior to emergence. Satisfactory guidance is particularly difficult during operations such as weeding or thinning which necessarily disturbs the earth surface adjacent to growing plants and yet must not disturb the plants themselves. Since the plants of a row crop are, of course, planted parallel to furrows in the earth surface, it is well known to attempt to guide an implement along the row by a pair of oppositely inclined wheels which engage the oppositely facing sides of a furrow or furrows.

These furrow engaging, inclined wheels provide satisfactory guidance of an agricultural implement along a row crop when the furrow is newly formed or when great accuracy is not required. However, the furrows are not primarily intended for precise guidance of implements along a row and have substantial irregularities due to clods of earth and to unavoidable movements transversely of the row by the implement which formed the furrows. The use of row crop furrows formed in a conventional manner to guide implements which work the earth closely adjacent to a crop, therefore, results in unwanted contact by the implement with the crop, often causing severe damage.

In any event, repeated working of the earth surface adjacent to furrows of a row crop and/or water running over the furrows from overhead irrigation or rainfall, result in the furrows losing their original "sine-wave" form, the furrows eventually becoming substantially obliterated and the earth surface becoming nearly planar. Such a surface does not provide guidance for the inclined wheels of an implement. As the furrows become obliterated, transverse irregularities develop or become more pronounced so that only improper, transversely wavering guidance can be derived from the furrows at the best.

Crop damage due to improper guidance of an agricultural implement along a row crop can be reduced by moving the implement relatively slowly along the row while being guided by an operator to avoid individual plants. Such slow movements, however, result in additional expense due to the time required to perform the operation. Even with the implement moving slowly, some crop damage is inevitable, even where the operator is careful and attentive.

PRIOR ART STATEMENT

In conformance with 37 C.F.R. 1.97 and 1.98, the applicant states that he is not aware of any prior art other than that discussed above which is relevant to the patentability of the subject invention.

SUMMARY OF THE INVENTION

It is an object of the present invention to provide an improved guidance system for agricultural implements.

Another object is to provide such a system which precisely guides an agricultural implement along a row of a row crop so that the earth surface can be worked closely to the plants of such a crop without harm thereto.

Another object is to provide such a system which is guided by a furrow parallel to said row.

Another object is to provide such a system which forms a track for guidance of the implement in the earth surface parallel to a desired linear path along said row.

Another object is to provide such a system which precisely guides an agricultural implement in a desired straight path along a row although previously formed furrows along the row are almost obliterated and/or irregular.

Another object is to provide such a system which allows relatively rapid movement of an agricultural implement along a row without requiring excessive concentration and dexterity on the part of an operator of the implement.

Another object is to provide such a system which is readily adapted to use with existing agricultural machinery and implements of diverse types and is well suited to existing techniques of row crop farming.

A further object is to provide such a system which is inexpensive, durable, rugged, and fully effective in accomplishing its intended purpose.

DESCRIPTION OF THE PREFERRED EMBODIMENT

Referring more particularly to the drawings, in FIGS. 1 through 4 is shown an agricultural implement 20 provided with a guidance system, generally indicated by the numeral 30, which embodies the principles of the present invention. The implement is mounted on a fragmentarily represented tractor 35 for earth traversing movement in a predetermined forward direction. The implement is illustratively connected to the tractor by a well-known three-point hitch 40 which permits limited movement of the implement relative to the tractor in a lateral direction, that is, transversely of said direction of movement.

Figure 4:
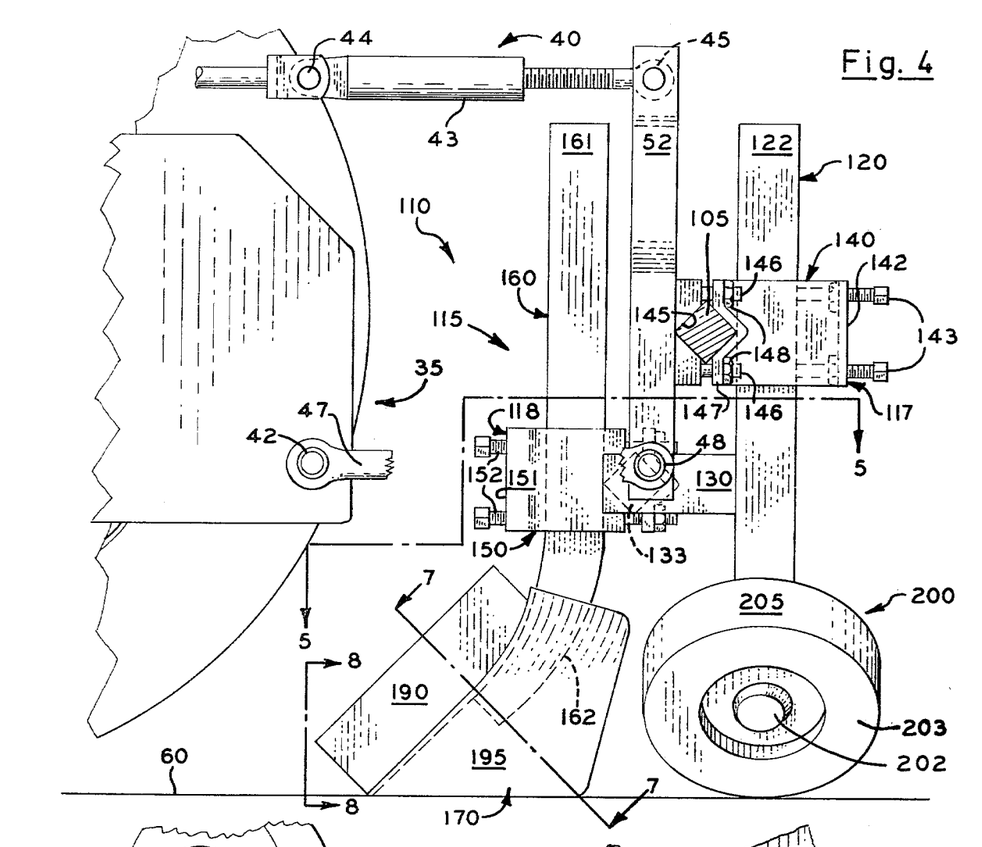
FIG. 4 is a fragmentary elevation at an enlarged scale of the implement and the tractor viewed from the position of line 4—4 in FIG. 1.
Figures 5, 6, 7, 8:
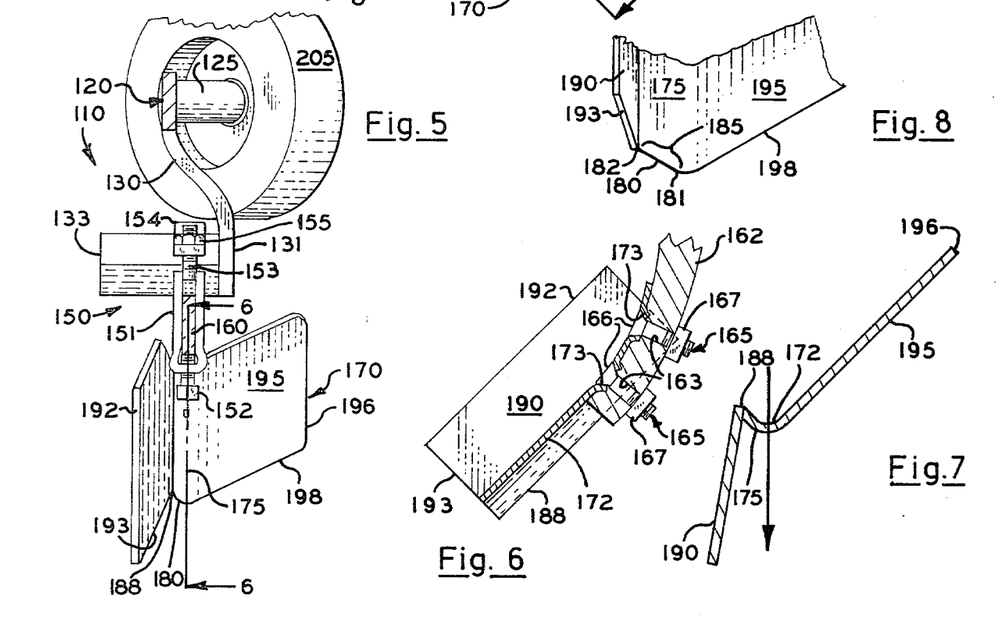
FIG. 5 is a fragmentary plan view taken from the position of line 5—5 of FIG. 4.
FIG. 6 is a fragmentary section of a furrowing shovel used in the system of the present invention taken on line 6—6 of FIG. 4.
FIG. 7 is a fragmentary section of the shovel at a further enlarged scale taken from the position of line 7—7 of FIG. 5.
FIG. 8 is a fragmentary front elevation of the shovel taken from the position of line 8—8 of FIG. 4.

The hitch has a pair of transversely spaced ball joints 42 and a turnbuckle assembly 43 mounted above and centrally between the ball joints and elongated in parallel to the direction of movement. The forward end of said assembly is connected to the tractor 35 by a loosely fitted clevis 44. The rearward end of the assembly has a ball joint 45. A pair of links 47 are individually mounted on the transversely spaced ball joints and extend rearwardly in a direction parallel to the turnbuckle assembly, terminating in individual ball joints 48. Each joint 42, 45, or 48 permits limited movement in all directions and incorporates a pivotal joint which provides substantial movement about a transverse, horizontal axis. The joints 48 are individually releasably connected to a clamp 50 of a well-known type utilized with agricultural equipment. The rearward portions of these clamps are adapted to receive a horizontal, transversely extended square tool bar. A pair of planar members 52 are individually rigidly connected to each of said clamps. The members extend vertically from their respective clamps and then centrally of the implement and upwardly toward the ball joint 45 of the turnbuckle assembly. The upper ends 53 of the members are disposed oppositely and adjacent to said ball joint and are rigidly connected therebelow. A releasable horizontal pin 55 interconnects said upper ends and pivotally receives the said ball joint. The hitch is adapted by pivotal movement about the horizontal axes of the ball joints in a well-known manner to raise the implement 20 for transportation and to lower it for use.

Figure 2:
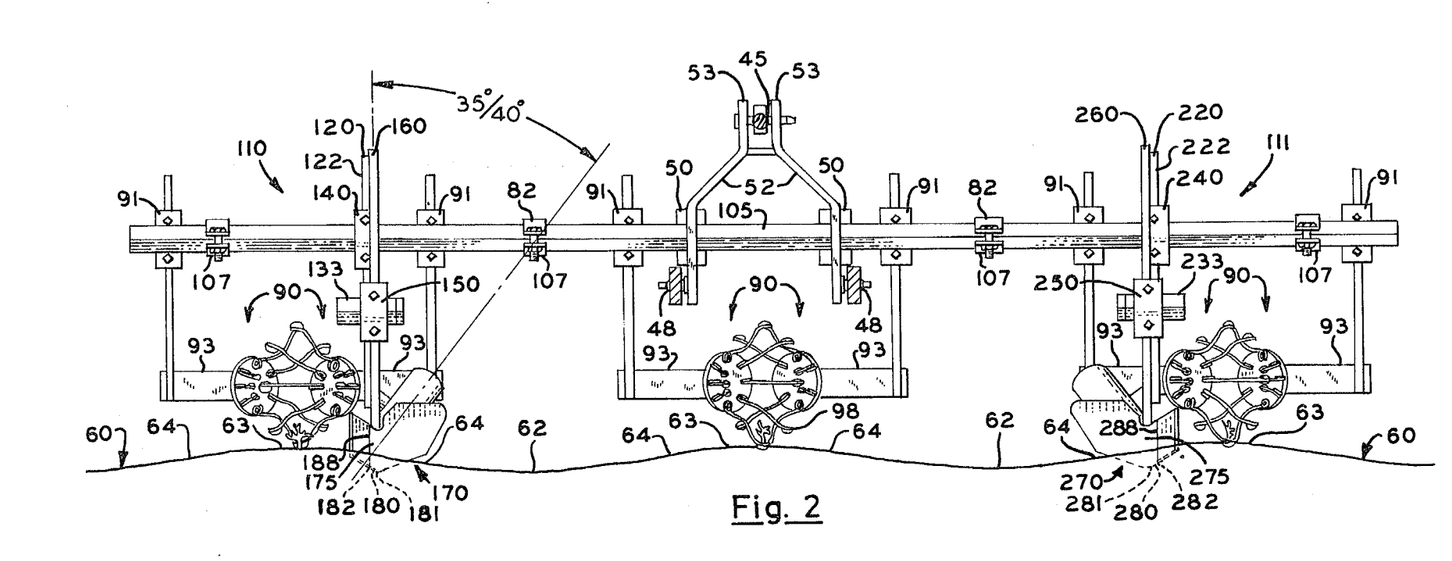
FIG. 2 is a sectional elevation of the implement taken on line 2—2 of FIG. 1 operating on an earth surface having a row crop growing along nearly obliterated furrows.

The implement 20 and tractor 35 are disposed on an earth surface 60. As illustrated, forwardly of the implement the surface has nearly obliterated, irregular furrows 62 and ridges 63 which extend generally parallel to plants 65 of a row crop. The furrows and ridges are interconnected by oppositely inclined walls 64 which, due to the near obliteration of the ridges and furrows, are inclined at relatively small angles to the horizontal. The nearly obliterated, irregular form of the furrows and ridges is due to the irregular action of water and of earth working tools during previous cultivations. As a result, the furrows and ridges "wander" transversely, although their general direction is constant. The plants are depicted in three rows 67 growing along the crests of said ridges. It is to be understood that three rows are depicted for illustrative convenience and that the guidance system 30 of the present invention is adapted for use with an implement operating on any other suitable number of rows.

Figure 1:
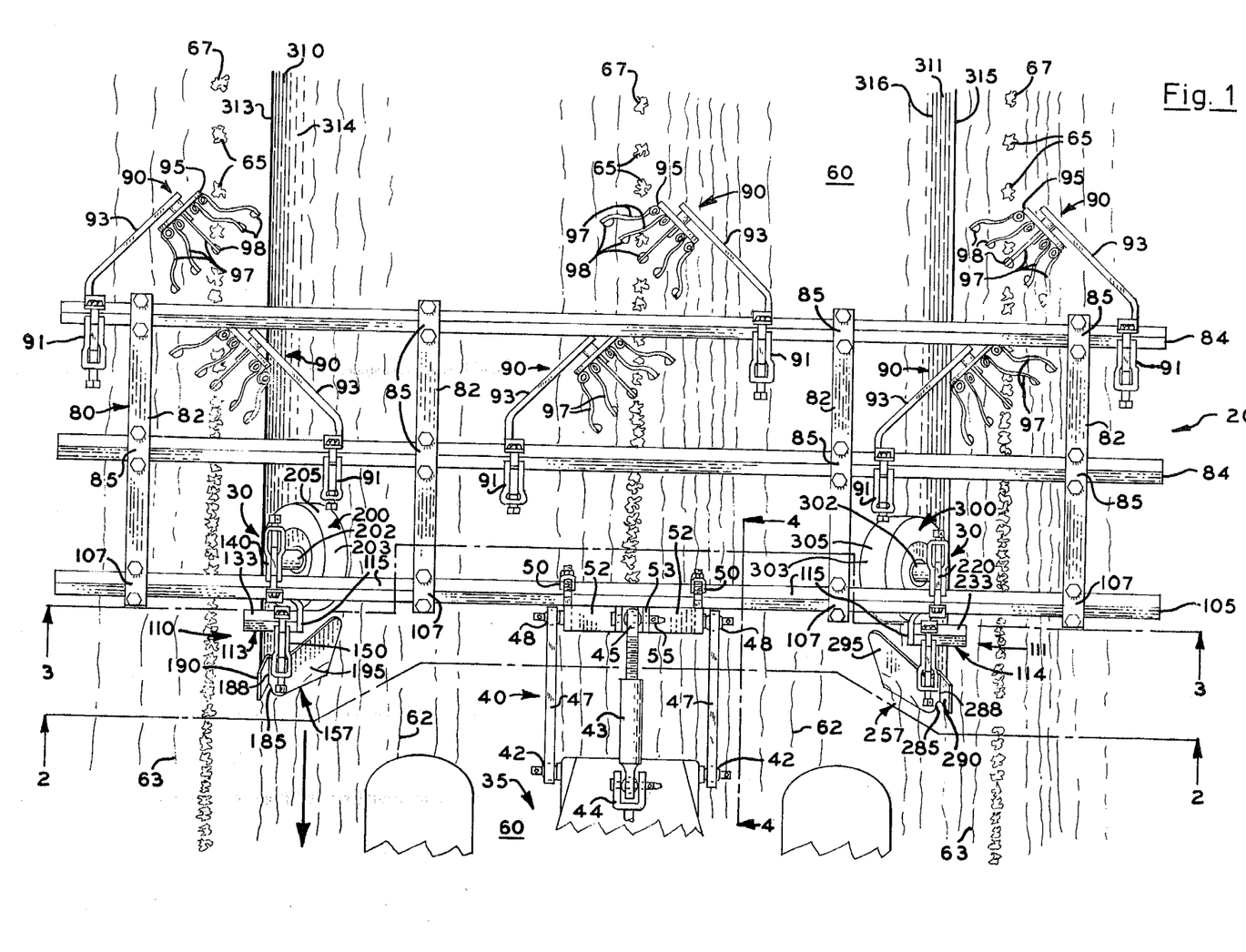
FIG. 1 is a plan view of an agricultural implement having a guidance system embodying the principles of the present invention in a representative operating environment including a fragmentarily represented tractor.

The implement 20 has a substantially horizontal, rectangular structure 80 of grid-like form as viewed in FIG. 1. The structure is of well-known construction and has four coextensive longitudinally extending bars 82 disposed in parallel, spaced relation. The structure includes a pair of transversely extending tool bars 84 mounted, respectively, centrally and rearwardly on the longitudinal bars by clamps 85. Said tool bars have a square cross section and are disposed in parallel, coextensive, longitudinally spaced relation. Each tool bar has three finger wheel assemblies 90 mounted thereon by clamps 91 of well-known form which provide for selective positioning of the assemblies vertically and horizontally in relation to said bars. Each assembly has a vertical shank 93 engaged by the clamp and has a wheel 95 mounted at the lower end of the shank. The wheel is disposed with its axial angled forwardly from the shank in a horizontal plane, as best shown in FIG. 1. The wheel has a plurality of fingers 97 extending generally along the surface of a conical frustum from the periphery of the wheel to tips 98 engaged with the earth surface 60. The axes of wheels mounted on each of said rearward bars are angled in opposite directions and the assemblies are disposed transversely on their respective bars so that the tips of an oppositely angled pair of the wheels engage the crest of each ridge 63 in closely adjacent relation to and oppositely of the plants 65 growing therein. The wheels are thus disposed in a well-known manner for weeding the earth surface adjacent to the plants. It is to be understood that the finger wheel assemblies are merely illustrative of tools that can be mounted on an implement guided by the system 30 of the present invention. Any desired type of tool for use with a row crop may be substituted for the finger wheels and, of course, various types of such tools can be mounted in a well-known fashion on a structure similar to the structure 80 and utilized in combination.

The guidance system 30 includes a transversely extending bar 105 substantially identical to the tool bars 84 and mounted forwardly thereof on the longitudinal bars 82. Said transversely extending bar is disposed in parallel coextensive relation with the tool bars and is individually clamped to the longitudinal bars by three clamps 107 substantially identical to the clamps 85. The transversely extending bar is a length of square stock of well-known form mounted with one of its corners disposed substantially vertically above the corner opposite thereto. This bar is received in the clamp 50 of the hitch 40 and rigidly clamped therein connecting the implement 20 to the tractor 35 for earth traversing movement.

Figure 3:
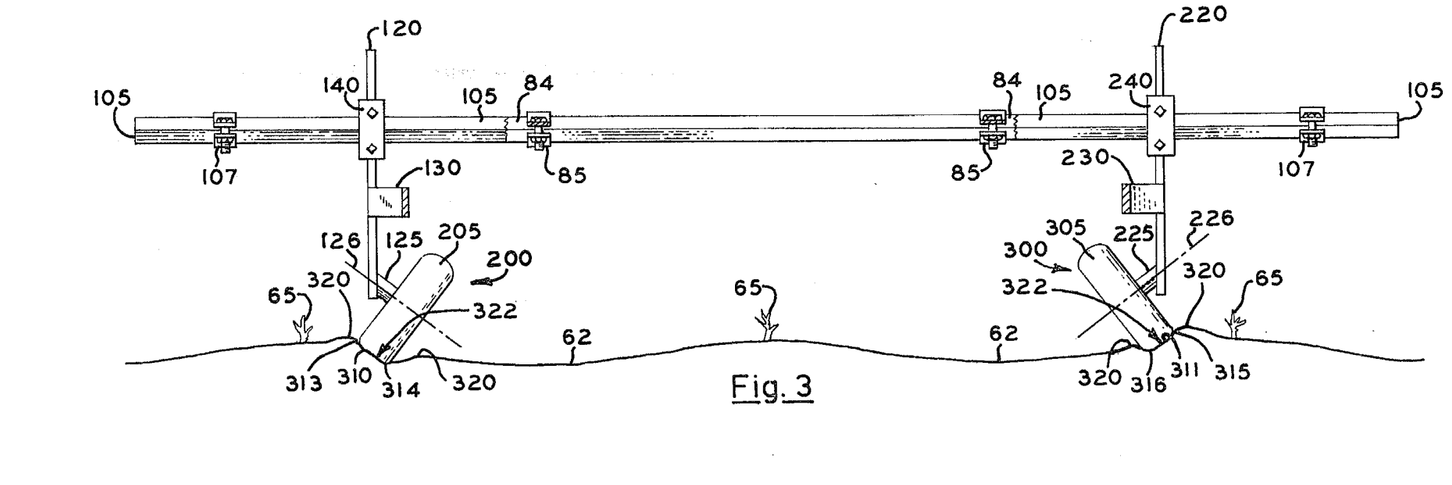
FIG. 3 is a sectional elevation of the implement, with portions omitted for clarity, taken from the position on line 3—3 of FIG. 1 showing a pair of tracks formed in the earth surface by said system individually engaged by a pair of wheels thereof.

The guidance system 30 includes a first guidance assembly 110 and a second guidance assembly 111 mounted on the bar 105. As can be seen from FIGS. 1 through 3, these assemblies have corresponding elements but one is "right-handed" and the other is "left-handed". That is, one assembly is a "mirror" image of the other in relation to the direction of travel of the implement 20. The first assembly is disposed toward the right side of FIG. 1 and the second assembly is disposed toward the left side thereof. As best shown in FIG. 3, the assemblies are individually related to the transversely opposite, outwardly disposed walls 64 of the outer pair of the ridges 63. The first assembly and the second assembly include subframes, indicated respectively by the numerals 113 and 114. The subframes are mounted on the transverse bar 105 and extend generally forwardly therefrom. The guidance system has a frame 115 formed by these subframes and the bar 105. Said frame has a rearward end portion 117 which includes said bar and has a forward end portion 118 disposed forwardly of said bar. Since said bar is clamped to the hitch 40, the frame is mounted on the tractor 35 for earth traversing movement. Due to the ball joints 42, 45, and 48, and the loosely fitted clevis 44, the frame has a limited movement transversely of said direction.

The second assembly 111 is a mirror image of the first assembly 110 as depicted in FIGS. 4 through 8. The second assembly has similar elements, proportions, and dimensions to the first assembly, and it is to be understood that the following description is generally applicable to both assemblies.

The subframe 113 of the first guidance assembly 110 has a rearward vertically elongated, rectangular planar shank 120. This shank lies substantially in a vertical plane which is disposed parallel to the direction of movement of the implement 20. The shank has an upper portion 122. The lower end of the shank is provided with a wheel mount 125 of well-known construction. The mount defines a rotational axis 126 extending transversely and downwardly toward the right from the shank, as viewed in FIG. 3. This axis lies substantially in a vertical plane disposed normally to the direction of movement of the implement 20 and to the general direction of the furrows 62. The axis is inclined at an angle to the horizontal in the range of 35 to 40 degrees.

The subframe 113 includes a substantially horizontal rectangular bar 130 which extends forwardly from the shank 120 to a forward end 131. The rearward end of the bar is fixed to the forward edge of the shank approximately at the vertical midpoint thereof. The upper portion 122 of the shank extends upwardly of the bar. As best shown in FIG. 5, the bar is bent horizontally so that its forward end is offset transversely in the direction of the wheel mount 125 a distance approximately equal to the thickness of the shank. The forward end of the bar has a relatively short transversely extending tool bar 133 fixed thereto. This tool bar is substantially parallel to the tool bars 84. The short tool bar has one end juxtapositioned to the side of the forwardly extending bar 130 which is disposed oppositely of the wheel mount. The short bar thus extends transversely oppositely of the wheel mount from the shank. The shank, the wheel mount, the forwardly extending bar, and the short tool bar are fixedly connected, as by welding.

The guidance assembly 110 has a rearward clamp 140 of conventional construction which releasably connects the bar 105 to the shank 120. This clamp has a vertically open box 142 which slidably receives the upper portion 122 of the shank. The box is provided with a pair of setscrews 143 which extend in screw-threaded engagement through the rearward side of the box into clamping engagement with the shank. The forward side of the box is provided with a triangular notch 145 which conforms to the rearward portion of said bar. A pair of screw-threaded studs 146 extends forwardly from the box adjacent to the notch and the other below it. The clamp includes a plate 147 having a central triangular bend which conforms to said bar. Said plate has a pair of bores disposed individually oppositely of the bend to receive the studs. The plate is fitted over the studs with its concave side facing the notch in the box. The clamp includes a pair of nuts 148 which individually screw-threadably engage the studs. The clamp is fitted to the bar 105 with the box disposed rearwardly thereof and with said plate and said notch engaged forwardly therewith. The clamp is releasably secured to the bar by tightening the nuts.

The guidance assembly 110 includes a forward clamp 150 of similar construction to the rearward clamp 140. The forward clamp has a vertically open, rearwardly notched box 151, a pair of forwardly disposed setscrews 152 screw-threadably extended therein, a pair of studs 153 extended rearwardly of the box, and a triangularly bent plate 154 fitted over the studs and secured by nuts 155. The forward clamp is fitted to the short tool bar 133 with said box and said plate oppositely engaged therewith and with the box disposed forwardly of said bar.

The first guidance assembly 110 has a first furrowing shovel assembly 157 mounted on the subframe 113 by the forward clamp 150. The shovel assembly has a forward vertically elongated, rectangular shank 160. This shank has an upper portion 161, which is slidably received within the box 151 of said clamp for clamping engagement by the setscrews 152, and has a lower portion 162 which extends from the upper portion to a point adjacent to the earth surface 60. The lower extremity of said lower portion is forwardly curved and has a pair of bores 163 extending through it substantially radially of said curve and generally longitudinally of the implement 20. These bores receive individual bolt assemblies 165 each having a forwardly disposed head 166 and a nut 167. The shank and the bolt assemblies are of a well-known type utilized in agricultural implements.

The first guidance assembly 110 includes a first furrowing shovel 170 which is unitarily constructed of sheet metal and is mounted on and forwardly of the curved lower portion 162 of the forward shank. The shovel engages the forward edge of the shank and extends transversely oppositely and downwardly therefrom. The shank engaging portion 172 of the shovel is rearwardly concave and is tilted rearwardly to engage the lower portion of the shank. Said portion is provided with a pair of bores 173 which are individually aligned with the bores 163 in the shank. A bolt assembly 165 is fitted through each aligned pair of bores with the head 166 disposed forwardly of the shovel. The shovel is secured to the shank by tightening the nuts 167.

The first furrowing shovel 170 has a transversely central portion 175. This portion extends transversely oppositely of the wheel mount 125 from the forward shank 160. This portion is angled somewhat rearwardly from the shank and extends downwardly therefrom, terminating in an earth engaging edge 180. This edge is substantially straight and has a lower or first end 181 disposed forwardly of said shank and aligned therewith in a direction parallel to the direction of travel of the implement 20. The edge is inclined upwardly and somewhat rearwardly from its lower end to a second or upper end 182. As projected in a plane extending normally to said direction, the edge is disposed at an angle to the horizontal substantially equal to the angle at which the axis 126 is inclined thereto. Typically, the edge 180 has a length of 5 to 10 cm. (2 to 4 inches). The edge thus forms a transversely inclined earth engaging, elongated first scraper blade 185 which extends transversely of said direction along the lower extremity of said central portion. The blade has, therefore, a high side corresponding to said upper end and a low side corresponding to said lower end. The central portion has a transversely disposed edge 188 which extends upwardly from the upper end 182 of the earth engaging edge in a substantially vertical plane extending substantially parallel to said direction of travel.

The first furrowing shovel 170 includes a first substantially erect planar guard 190. The guard is substantially rectangular and its rearward edge is coincident with the edge 188 of the central portion 175. The guard extends forwardly from said edge to a forward edge 192. This edge is spaced somewhat transversely away from said central portion so that the guard diverges somewhat from the direction of travel forwardly of the edge 188. The guard has a lower edge 193 which extends forwardly and upwardly from the upper end 182 of the edge 180 of said portion. Typically, the length of the lower edge is approximately 10 cm. (41 inches) and the length of the forward edge is approximately 20 cm. (8 inches) and the guard is divergent from the direction of travel at an angle of approximately 15 degrees.

The first furrowing shovel 70 includes a first wing 195 which extends from its central portion 175 rearwardly and transversely oppositely of the guard 190 to an outer edge 196. The wing has a substantially straight edge 198 which extends upwardly from the lower end 181 of the edge 180 of the central portion. Typically, the wing has the form of a transverse half of a well-known type of plow or furrowing shovel. The wing is inclined rearwardly from its lower edge and is somewhat forwardly concave toward said outer edge.

The first guidance assembly 110 includes a first wheel 200 which is mounted in following relation to the first scraper blade 185 on the wheel mount 125 for rotation about the axis 126. This wheel is of a well-known type utilized in agricultural equipment, having a center 202 circumscribed by a resilient tire 203. The tire has a substantially cylindrical, circumferential, earth engaging tread 205 having an axis substantially coincident with the axis 126. Typically, the width of the tread is approximately equal to the length of the edge 180 of the first furrowing shovel. As previously described, said edge, as projected in the plane of the axis 126 is parallel to the axis. The plane of rotation of the wheel is, therefore, substantially normal to said edge.

The second guidance assembly 111 is, as previously mentioned, similar to the first guidance assembly 110 but is a mirror image thereof. The elements of the second assembly, therefore, correspond in number and kind to those of the first assembly and corresponding elements have substantially the same dimensions and proportions. The second assembly will therefore only be described to the extent that its construction is related to the overall operation of the system 30 of the present invention.

The subframe 114 of the second guidance assembly 111 has a rearward vertically elongated shank 220. The shank includes a wheel mount 225 which defines a rotational axis 226. This axis, similarly to the axis 126, lies substantially in a plane disposed normally to the direction of travel and is inclined to the horizontal at an angle in the range of 35 to 40 degrees. However, the axis 226 is inclined downwardly from the shank 220 in the opposite direction from the axis 126. That is, the axis 226 of the second assembly is inclined downwardly toward the left as viewed in FIG. 3.

The subframe 114 includes a horizontal bar 230 which extends forwardly from the shank 220. The rearward end of this bar is fixed to the shank approximately at its vertical center, and the bar extends therefrom to a forward end 231. This bar is bent horizontally so that its forward end is offset transversely from said shank toward the wheel mount 225. A short horizontal tool bar 233 is mounted on the forward end and is extended transversely therefrom in a direction away from the wheel mount.

The guidance assembly 111 has a rearward clamp 240 which is substantially identical to the clamp 140 and which connects the shank 220 to the bar 105. The second guidance assembly 111 has a forward clamp 250 which is fitted on the tool bar 233 and is substantially identical to the clamp 150.

The second guidance assembly 111 includes a second furrowing shovel assembly 257 mounted on the subframe 114 by the clamp 250. This shovel assembly has a vertically elongated forward shank 260 which is substantially identical to the shank 160, and is slidably received in the clamp 250. The second shovel assembly includes a second furrowing shovel 270 downwardly mounted on said shank. The shovel has a shank engaging portion, similar to the corresponding portion 172 of the first shovel 170, and secured to said shank in a manner similar to that in which said portion is secured to the shank 160.

The second furrowing shovel 270 has a transversely central portion 275 which extends transversely from the shank 260 oppositely of the wheel mount 225. This central portion extends downwardly from said shank to a substantially straight, earth engaging edge 280. This edge has a lower end 281 disposed forwardly of said shank and extends transversely and upwardly therefrom to an upper end 282 and thus forms a second scraper blade 285 having a high side and a low side corresponding, respectively, to said ends. Said edge, as projected into a plane disposed normally to the direction of movement of the implement 20 and containing the axis 226, is parallel to said axis. As a result, the second blade, transversely of said direction, is inclined oppositely to the first scraper blade 185. Said edge extends somewhat rearwardly from its lower end to its upper end. The central portion extends transversely from the shank 220 to a substantially straight edge 288 which lies substantially in a vertical plane extending parallel to said direction of movement and through the upper end of said earth engaging edge.

The second furrowing shovel 270 includes a second substantially erect, rectangular, planar guard 290 having an edge coincident with the edge 288 of the central portion 275. The guard extends forwardly from said edge in divergent relation to the direction of travel of the implement 20. Said guard diverges transversely in a direction opposite to that in which the first guard 190 diverges from said direction.

The second shovel 270 includes a second wing 295 of plow-like form which extends rearwardly and transversely oppositely of the guard 290 from the central portion 275. Transversely of the direction of movement of the implement 20, said wing thus extends from said central portion in a direction opposite to that in which the first wing 195 extends from the central portion 175.

The second guidance assembly 111 includes a second wheel 300 mounted in following relation to the second scraper blade 285 on the wheel mount 225 for rotation about the axis 226. The second wheel thus rotates in a plane substantially normal to the projection of the edge 288 in a plane normal to direction of movement of the implement 20. Said wheel is substantially identical to the first wheel 200, having a center 302 and a tire 303 having an earth engaging cylindrical tread 305 whose axis is substantially adjacent with the axis 226.

OPERATION

The operation of the described embodiment of the present invention is believed to be clearly apparent and is briefly summarized at this point.

An implement 20 having a guidance system 30 of the present invention is most frequently used with the earth surface 60 having furrows 62 and ridges 63, best shown in FIGS. 1 through 3. The implement 20 is transported in a suitable manner, as by the tractor 35 and hitch 40, to a field of operation. The tractor is then disposed for forward movement along the rows 67. The grid structure 80 is next positioned, as by the hitch, in a substantially horizontal disposition at a suitable elevation above the furrows and ridges with the longitudinal bars approximately parallel thereto. Tools, typified by the finger wheels 95, mounted in said structural form for row crop operations are then brought into their usual operating positions. Each finger wheel assembly 90 is positioned by loosening its respective clamp 91 and urging it vertically and horizontally until, at the lowest point in the revolution, the tips 98 of its fingers 97 engage the earth surface in closely adjacent relation to the plants 65.

The nuts 148 of the clamp 140 of the first guidance assembly 110 are then loosened, releasing the assembly for slidable transverse movement along the bar 105. The assembly is slid to a position above the corresponding one of the furrows 62 with the shank 120 disposed approximately above the transverse midpoint of the wall 64 which has the same generally upward inclination as the first scraper blade 185. Said nuts are then tightened, clamping the assembly in said selected position. The setscrews 143 are next loosened releasing the shank for slidable vertical movement in the box 142 relative to the bar 105. The subframe 113 is then raised from or lowered toward the earth surface 60 to a position in which the tread 205 of the tire is firmly engaged with said furrow wall and tightened, clamping setscrews to the subframe in said position. The wheel is thus disposed for rolling engagement with the earth surface. While the guidance assemblies 110 and 111 are illustratively represented in FIGS. 1 and 3 adjacent to the rows of plants 65 to show their utilization in such positions, it will be understood that they are more frequently utilized midway between the rows.

The furrowing shovel 170 is next adjusted horizontally and vertically into its proper position. In this position, the earth engaging edge 180 is disposed so that its projection in a vertical plane extending transversely of said direction of travel and the projection in said plane of the line of the bottom of the tread 205 are substantially coincident. The distance in said plane between the axis and said projection is then substantially equal to the radius of the tread. The necessary horizontal adjustment of the shovel is obtained by loosening the nuts 155 of the forward clamp 150 and sliding the shovel and clamp transversely along the short tool bar 133. The proper vertical position is obtained by loosening the setscrews 152 and sliding the shank 160 in the box 151 so that the shovel moves toward or from the earth surface into said position. When the described position of said edge is achieved, the shovel is clamped therein by tightening said nuts and setscrews.

The second guidance assembly 111 is adjusted in a manner similar to that described for the first guidance assembly 110 by loosening the clamps 240 and 250, releasing the subframe 114 for slidable vertical and transverse movement in relation to the bar and releasing the furrowing shovel 270 for similar movement in relation to the subframe. The subframe is then adjusted so that the tread 305 of the wheel 300 engages the earth surface 60 centrally of a wall 64 which is inclined upwardly in the same direction as the second scraper blade 285 bearing the edge 280. The furrowing shovel assembly 257 is then adjusted so that said edge is aligned vertically and transversely with the tread, as viewed in a direction parallel to the direction of movement of the implement 20. When the adjustment of the second guidance assembly is complete, its elements are secured by tightening the clamps 240 and 250 to retain them in said adjustment.

When the adjustments to the implement 20 and the guidance system 30 are complete, the implement is drawn across the earth surface 60 by the tractor 35 in a direction which is generally parallel to the furrows 62 and ridges 63. Since the furrows and ridges are nearly obliterated, and wander transversely of that general direction, any guidance as by an operator of the tractor is only correct as to the general direction. However, as the implement is drawn in a direction generally parallel to the furrows 62 and the ridges 63, the first scraper blade 185 and the second scraper blade 285 form respective first and second paths or tracks 310 and 311 in the earth surface. Since these edges are straight, the tracks formed thereby are substantially planar and are upwardly inclined transversely of the direction of movement of the implement at approximately the same angle as that at which the corresponding edges 180 and 280 are inclined. The first track has, therefore, a high side 313 corresponding to the upper end 182 of the edge 180 and a low side 314 corresponding to the lower end 181. The second track has a high side 315 and a low side 316 corresponding, respectively, to the ends 282 and 281 of the second edge. Since said edges are inclined oppositely in relation to the horizontal, the high and low sides of the second track are disposed transversely oppositely to the high and low of the first track.

As the implement 20 moves along the rows 67 with the respective scraper blades 185 and 285 of the furrowing shovels 180 and 270 forming the tracks 310 and 311, earth adjacent to their respective high sides 313 and 215 tends to gravitate onto the tracks and destroy their planar form. Such movement of earth is prevented by the planar first guard 190 and second guard 290 which act as barriers to the movement of earth adjacent to the corresponding high sides of the track and deflect the earth therefrom. As the scraper blades form the tracks, as best shown in FIG. 1, the respective ends 181 and 281 of the edges 180 and 280 are disposed below the initial position of the furrow walls 64 and engage earth adjacent to the respective lower edges of the track. This earth is engaged with a plow-like action by the corresponding wing 195 or 295 and displaced transversely away from the track along the wing. As the furrowing shovels form their respective tracks 310 and 311, earth from the walls is displaced transversely oppositely of the tracks to form a pair of ridges 320 parallel to each track at its upper and lower sides. The tracks and the ridges thus form a pair of guidance furrows 322 in the earth surface parallel to the direction of movement of the implement 20 with each track disposed so as to form one wall of its respective guidance furrow.

As the implement 20 moves along the rows 67, the wheels 200 and 300, respectively, engage the tracks 310 and 311 in rolling relation. This engagement occurs because the wheels are disposed in following relation, respectively, to the blades 185 and 285 which formed the tracks and are adjusted to be aligned vertically and transversely therewith. Each wheel is thus presented an individual, precisely formed planar track which conforms to its corresponding cylindrical tread, 205 or 305 and which is disposed normally to its respective plane of revolution. Any force exerted on the implement 20 in a direction transversely of its direction of movement which tends to cause it to deviate from a path parallel to the rows 67 is transmitted through the clamps 107 to the frame 115 so as to develop a thrust toward the corresponding tread toward the high side, 313 or 315 of the transversely corresponding track. The thrust is resisted by engagement of the tread with the track, precisely maintaining the direction of movement of the implement along the rows. The furrows 322 formed by the shovels 170 and 270 thus guide the grid-like structure 80 of the implement in a desired straight path along said rows. As a result, as best shown in FIG. 1, the assemblies 90 can be adjusted so that the tips 98 of the wheels 95 pass along the rows in closely adjacent relation to the plants 65 without damaging them.

As the tractor 35 moves along the rows, it deviates or wavers to a greater or lesser extent transversely from a course parallel thereto. However, due to the transverse movement of the implement 20 relative to the tractor provided by the hitch 40, the system 30, in cooperation with the guidance furrows 322 generated thereby, constrains the implement 20 to move substantially parallel to the rows. Since the course of the tractor does not need to be manually precisely controlled, the tractor can be moved relatively rapidly so that the tractor and implement can accomplish more row crop work in a given time.

Although the operation of the guidance system 30 of the present invention has been described for use with preexisting, nearly obliterated furrows 62 and ridges 63, it is to be understood that a guidance assembly 110 or 111 can be utilized to form an initial guidance furrow 322 when the earth surface is substantially planar. Once an implement having a guidance system embodying the principles of the present invention has been used to form the tracks 310 and 311, the implement can be utilized in a subsequent row crop operation and for precise guidance by said previously created tracks while a furrowing shovel substantially identical to the shovels restores the tracks to their original form.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A guidance system for agricultural implements comprising:
    A. a furrowing shovel for forming a guidance furrow in the earth surface along a predetermined direction of travel, the shovel having
        (1) a central portion having a downwardly disposed, earth engaging edge which extends transversely and upwardly from a first end thereof to a second end thereof, the central portion extending upwardly from said edge,
        (2) an erect planar guard intersecting the central portion along a line lying in a substantially vertical plane substantially through said second end and extending parallel to said direction of travel, the guard extending in said direction from said line, and
        (3) a wing extending oppositely of said direction from the central portion transversely oppositely thereof from the guard;
    B. furrow-following means rearwardly spaced from the shovel disposed for furrow engagement and having a wheel spaced from the shovel in a direction oppositely of said direction of travel, the wheel having an axis extending substantially parallel to the projection of said earth engaging edge in a plane disposed normally to said direction of travel and a radius substantially equal to the distance in said plane between said axis and said projection wherein the angle between said axis and the horizontal is in the range of approximately thirty-five to forty degrees; and
    C. means interconnecting the shovel and furrow-following means in fixed relative positions whereby the furrow-following means guides the shovel.

2. A guidance system for agricultural implements comprising:
    A. a frame having predetermined forward and rearward end portions;
    B. means mounting the frame for forward earth traversing movement and limited lateral adjustment;
    C. a first elongated scraper blade mounted on the forward end portion of the frame in earth engagement disposed transversely of the direction of movement, said blade being inclined transversely of said direction of movement and adapted to form a first planar track in the earth having a high side and a low side;
    D. first plow means mounted in the frame adjacent to the low side of the first blade to engage earth adjacent to the low side of the first track and displace it transversely away from said track;
    E. a first substantially planar guard mounted in the frame adjacent to the high side of the first blade in earth engagement, said first guard being disposed in a substantially erect plane substantially aligned with the direction of travel to act as a barrier to movement of earth adjacent to the high side of the first track onto the track;
    F. a first wheel having a substantially cylindrical tread mounted on the frame in rolling engagement with the first track on an axis inclined transversely of the direction of movement substantially equally to the inclination of the first scraper blade so that the tread conforms to the first track to resist thrust on the frame transversely of the direction of movement toward the high side of the first blade;
    G. a second elongated scraper blade mounted on the forward end portion of the frame in earth engagement disposed transversely of the direction of movement, said second blade being inclined transversely of said direction of movement oppositely to the inclination of the first blade and adapted to form a second planar track in the earth having high and low sides opposite respectively to the high and low sides of the first track;
    H. second plow means mounted on the frame adjacent to the low side of the second blade to engage earth adjacent to the low side of the second track and displace it transversely away from said track;
    I. a second substantially planar guard mounted in the frame adjacent to the high side of the second blade in earth engagement, said first guard being disposed in a substantially erect plane substantially aligned with the direction of travel to act as a barrier to movement of earth adjacent to the high side of the track onto the track; and
    J. a second wheel having a substantially cylindrical tread mounted on the frame in rolling engagement with the second track on an axis inclined transversely of the direction of movement substantially equally to the inclination of the second scraper blade so that the tread conforms to the second track to resist thrust on the frame transversely of the direction of movement toward the high side of the second blade.

3. A guidance system for agricultural implements comprising:
  A. a frame;
  B. means for mounting the frame for earth traversing movement in a direction of travel and limited lateral adjustment;
  C. a pair of scraper blades mounted on the frame spaced from each other transversely of said direction of travel for scraping earth engagement and said blades having corresponding edges inclined substantially transversely of the direction of travel from corresponding lower ends to corresponding upper ends oppositely outwardly spaced from the lower ends to form spaced, substantially parallel first and second tracks during said scraping earth engagement inclined upwardly and outwardly transversely of the direction of travel; and
  D. a pair of wheels mounted on the frame for rolling earth engagement spaced from each other transversely of the direction of travel and individually in trailing relation with respect to the direction of travel to the scraper blades of said pair and said wheels mounted on the frame for rotational movement about individual axes of rotation individually substantially parallel to the tracks formed by the scraper blades with respect to which they are in trailing relation so as to dispose said wheels in inclined attitudes in individual outward engagement with said tracks resisting said lateral adjustment of the frame to guide said earth traversing movement thereof.

* * * * *

UNITED STATES PATENT AND TRADEMARK OFFICE
CERTIFICATE OF CORRECTION

PATENT NO. : 4,282,934

DATED : August 11, 1981

INVENTOR(S) : Paul A. Bezzerides

It is certified that error appears in the above-identified patent and that said Letters Patent are hereby corrected as shown below:

Column 2, line 60, begin the description of Fig. 8 as a new paragraph;

Column 4, line 7, change "axial" to ---axis---; and

Column 10, line 30, insert ---sides--- after "low".

Signed and Sealed this

Twenty-seventh Day of October 1981

[SEAL]

Attest:

Attesting Officer

GERALD J. MOSSINGHOFF

Commissioner of Patents and Trademarks